May 29, 1928.
G. F. MURPHY
EXPANSION JOINT
Filed Nov. 4, 1924  2 Sheets-Sheet 1
1,671,308
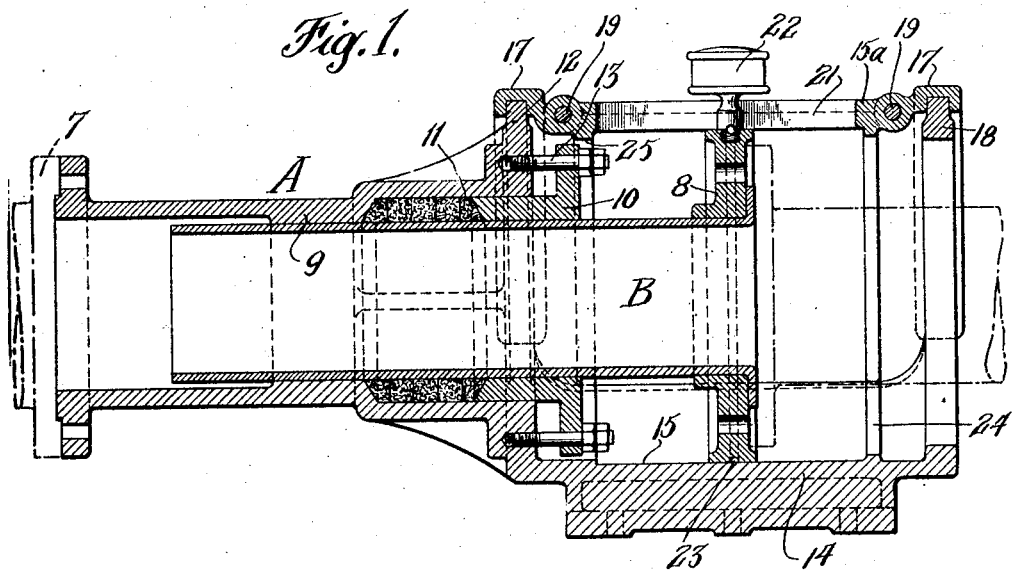
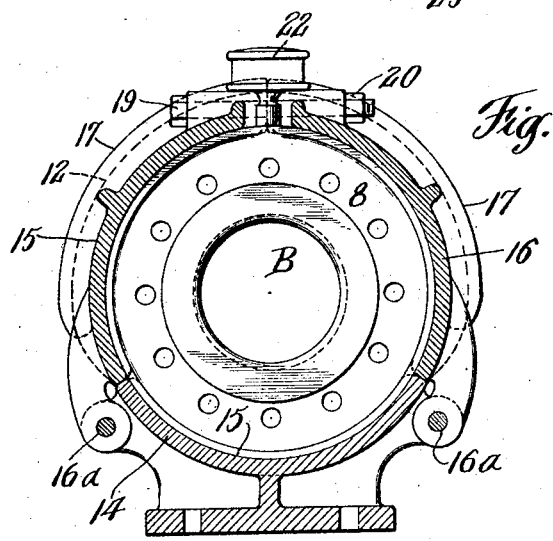
INVENTOR
George F. Murphy
BY
Symmestvedt + Lechner
ATTORNEYS May 29, 1928.
G. F. MURPHY
EXPANSION JOINT
Filed Nov. 4, 1924
1,671,308
2 Sheets-Sheet 2
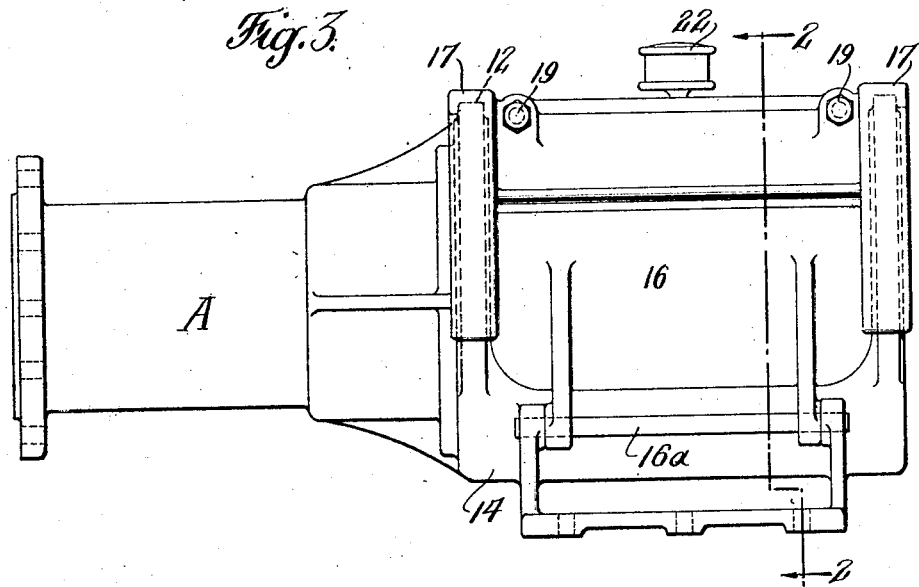
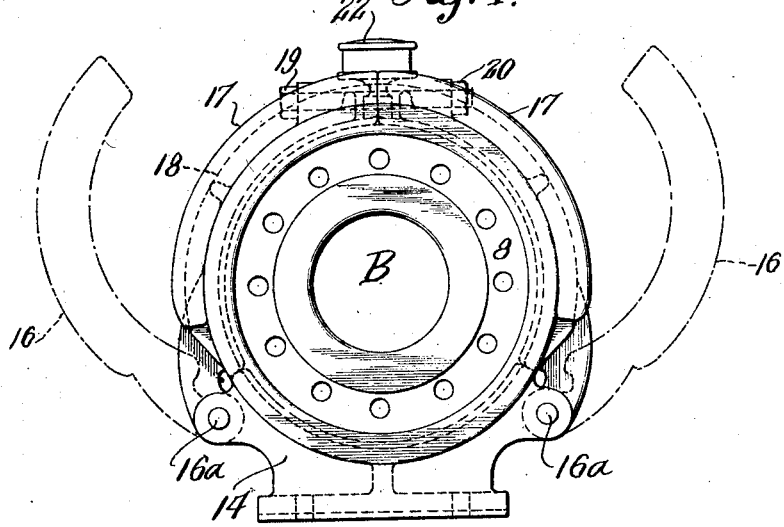
INVENTOR
George F. Murphy
BY
Synnestvedt & Lechner
ATTORNEYS Patented May 29, 1928.

1,671,308

UNITED STATES PATENT OFFICE.

GEORGE F. MURPHY, OF PHILADELPHIA, PENNSYLVANIA.

EXPANSION JOINT.

Application filed November 4, 1924. Serial No. 747,713.

This invention relates to expansion joints suitable for use in steam and other pipe lines and has for one of its primary objects provision of a guided expansion joint which, among other things, is adapted to be used in large lines such as oil lines.

More specifically my invention contemplates a guided expansion joint wherein the stuffing box joint may be readily exposed for adjustment or renewal.

A further advantage of the invention is to provide a guided expansion joint, in which the working surfaces are effectively lubricated.

In general I propose a simple inexpensive construction of guided joint which is effective in operation.

Other and more detailed objects and advantages will appear from the following description of the best form of my invention now known to me, which form is illustrated in the accompanying drawings, wherein—

Fig. 1 is a longitudinal section thru a joint embodying my improvements.

Fig. 2 is a section taken from the line 2—2 of Fig. 3.

Fig. 3 is a side elevation of the joint shown in Fig. 1 and

Fig. 4 is an end elevation of Fig. 3, indicating different positions of certain of the parts.

Referring now to the drawings, reference character A denotes a casing adapted to be secured at one end to a pipe section 7 of the line; and the reference character B denotes a tubular or pipe section which is telescopic within the casing A and is provided at its free end with a piston or head 8 adapted to be connected to another section of the line. The casing A is provided with an internal annulus 9 and is otherwise so constructed that such casing and the pipe section B cooperate to provide a stuffing box joint which has a gland 10, the joint being packed with packing 11 of any desired character.

The casing A has a flange 12 at one end adapted to receive the studs 13 by which the gland is adjustably secured to the casing.

By the arrangement shown the packing may be compressed and the gland locked in adjusted position.

Cast integral with the casing A and extending forwardly of the flange 12 is a segmental guide foot or plate 14 which has an arcuate machined face 15 on which the piston head 8 is adapted to slide during expansion and contraction.

To provide protection for the sliding surfaces and also to help guide the section B, and to expose the gland and the adjusting nuts, I employ two segmental plates 16 which may be termed "inspection doors" and which are hinged or pivoted to the guide plate 14, as indicated at 16ª. These doors, at each end, are provided with a rimlike portion 17, the left hand one of which is adapted to fit over the flange 12 of the casing A when the doors are in closed position. The right hand rim is adapted to fit over an annular ringlike member 18 integral with the guide plate 14. The rimlike portions of the two doors are adapted to abut as indicated in Fig. 2, when the doors are in closed position and the two doors are locked in this position by means of the bolts 19 and nuts 20. Thus with the doors closed and the bolts 19 tightened, the two doors seat firmly against each other and lock with the flange 12 and with the ring 18, and brace the guide plate 14, the parts cooperating to provide a rigid though composite structure guiding the piston head 8.

Intermediate their ends the doors are cut away to provide a slot 21 extending longitudinally of the joint. By this arrangement I may mount an oil cup 22, or other suitable lubricating device, upon the piston, the oil working around the piston by means of a suitable oil groove 23, insuring lubrication of all sliding surfaces.

To expose the stuffing joint and its parts, the bolts 19 are loosened, and the members 16 swung open to the position indicated in Fig. 4. By making all bolt heads and nuts of the same size, the same tool may be used to open the doors and adjust the gland.

The guide plate 14 and the doors are provided with ribs which cooperate, when the parts are in closed position, to provide substantially annular, spaced flanges 24 and 25, limiting the extent of movement of the piston.

It will be observed that the guide plate 14 serves to support the parts in alignment when the inspection doors are opened for inspection or adjustment.

I claim:

1. In an expansion joint for pipe lines and the like, a casing, a pipe telescopic in the casing, a packed joint therebetween, and guide means for the pipe pivoted to swing to a position exposing the packing joint.

2. In an expansion joint for pipe lines and the like, a casing, a pipe telescopic in the casing, a packed joint therebetween, and a pair of pivoted guide members swingable to expose the packing joint.

3. In an expansion joint for pipe lines and the like, a casing, a pipe telescopic in the casing, and a packed joint therebetween, said casing being provided with guide means including one or more doors.

4. In an expansion joint for pipe lines and the like, a casing, a pipe telescopic in the casing, and provided with a piston-like head, and a sectional cylindrical guide means therefor, a section of which is rigid with the casing for support and a section of which is movable to expose the joint.

5. In an expansion joint for pipe lines and the like, a casing, a pipe telescopic in the casing, and provided with a piston-like head, a cylindrical guide means therefor having a longitudinal opening, and a lubricant cup, carried by the piston head and movable in said opening.

6. In an expansion joint for pipe lines and the like, a casing, a pipe telescopic in the casing, a packed joint therebetween, and guide means for the pipe comprising segments one or more of which are pivoted.

7. In an expansion joint for pipe lines and the like, a casing, a pipe telescopic in the casing, a packed joint therebetween, and a cylindrical guide means for the pipe provided with stops on the inside thereof, said guide means comprising segmental sections one or more of which are pivoted.

8. In an expansion joint for pipe lines and the like, a casing, a pipe telescopic in the casing, a packed joint therebetween, and a cylindrical guide means for the pipe composed of segments, together with means for supplying lubricant between adjacent segments.

9. In an expansion joint for pipe lines, a casing, a pipe telescopic therein, and a guide casing therefor including one or more removable doors.

10. In an expansion joint for pipe lines, a casing, a pipe telescopic therein, and a guide segment therefor including one or more removable doors, the casing and segment being integral.

11. In an expansion joint for pipe lines a casing, a pipe telescopic therein, a stuffing box joint therebetween including a gland, and a cover for the joint split and hinged longitudinally of the joint and openable to expose the joint.

12. In an expansion joint for pipe lines, a casing, a pipe telescopic therein, a stuffing box joint therebetween including a gland, a guide on the casing, and a cover carried by the guide, said guide functioning to support the pipe when the cover is removed.

13. In an expansion joint for pipe lines, a casing, a pipe telescopic therein, a head on the pipe, a guide therefor, said guide comprising a housing and means carried by the head and working through said housing for lubricating the sliding surfaces.

14. An expansion joint for pipe lines and the like comprising a casing, a pipe telescopic therein, a packed joint therebetween, a head on the pipe, and a sectional guide for the pipe carried by the casing openable to expose the joint, a section of which, however, is rigid with the casing to function as a support when the joint is exposed.

In testimony whereof, I have hereunto signed my name.

GEORGE F. MURPHY.